United States Patent

Iwano et al.

[11] Patent Number: 5,992,131
[45] Date of Patent: *Nov. 30, 1999

[54] FILLING AND PACKAGING APPARATUS

[75] Inventors: Fumiyuki Iwano; Hiroshi Katayama; Tetsuya Iuchi; Masafumi Fujimoto; Michio Ueda, all of Tokushima-ken, Japan

[73] Assignee: Shikoku Kakoki Co., Ltd., Tokushima-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/925,674

[22] Filed: Sep. 9, 1997

[30] Foreign Application Priority Data

Sep. 17, 1996 [JP] Japan .................................. 8-244707

[51] Int. Cl.⁶ ............................................... B65B 9/02
[52] U.S. Cl. .............................. 53/451; 53/452; 53/551
[58] Field of Search ............................ 53/451, 551, 452, 53/450, 552, 550, 370.4, 370.5

[56] References Cited

U.S. PATENT DOCUMENTS

| | | | |
|---|---|---|---|
| 2,113,636 | 4/1938 | Vogt | 53/451 |
| 2,145,941 | 2/1939 | Maxfield | 53/551 |
| 2,432,373 | 12/1947 | Bleam | 53/451 |
| 3,055,154 | 9/1962 | Markley | 53/551 |
| 3,325,961 | 6/1967 | Lindh | 53/451 |
| 3,542,570 | 11/1970 | Bush | 53/451 |
| 3,849,965 | 11/1974 | Dominici | 53/451 |
| 4,291,520 | 9/1981 | Prince | 53/551 |
| 4,580,392 | 4/1986 | Lagerstedt | 53/451 |
| 4,599,850 | 7/1986 | Kopp | 53/551 |
| 4,729,210 | 3/1988 | Galliano | 53/451 |
| 4,996,825 | 3/1991 | Bacon et al. | 53/451 |
| 5,182,128 | 1/1993 | Laplace | 53/451 |
| 5,551,206 | 9/1996 | Fukuda | 53/451 |

FOREIGN PATENT DOCUMENTS

| | | |
|---|---|---|
| 29096 | 5/1981 | European Pat. Off. . |
| 678450 | 10/1995 | European Pat. Off. . |
| 781707 | 7/1997 | European Pat. Off. . |
| 58-193206 | 11/1983 | Japan . |
| 1-23366 | 5/1989 | Japan . |
| 3-162228 | 7/1991 | Japan ................... 53/551 |
| 7-24938 | 1/1995 | Japan . |
| 7-164524 | 6/1995 | Japan . |
| 405771 | 2/1974 | U.S.S.R. .................. 53/551 |
| 96/17773 | 6/1996 | WIPO . |

*Primary Examiner*—Peter Vo
*Assistant Examiner*—James P Calve
*Attorney, Agent, or Firm*—Smith, Gambrell & Russell, LLP

[57] ABSTRACT

There is provided a superhigh-speed filling and packaging apparatus having a high performance capable of manufacturing more than 8,000 packs per hour without leaving fluid at sealed parts of the containers. The filling and packaging apparatus fills a packaging material web formed in a tubular shape with fluid to manufacture package containers. The apparatus includes a lateral sealing apparatus for laterally sealing the tubular web filled with the fluid at intervals, each corresponding to one container, and a cutting apparatus, disposed under and remote from the lateral sealing apparatus, for cutting sealed parts of the containers while the containers are suspended to separate the containers.

14 Claims, 10 Drawing Sheets

FILLING AND PACKAGING APPARATUS

BACKGROUND OF THE INVENTION

1. Field of the Invention

The present invention relates to a high-speed filling and packaging apparatus for manufacturing parallelepiped package containers filled with fluid content such as juice and a cutting apparatus employed by this filling and packaging apparatus.

2. Prior Art

There is known a conventional filling and packaging apparatus comprising an unwinder for supporting a web serving as a packing material (hereinafter referred to simply as packaging material web) in an rolled state, a unwinding apparatus for unwinding the web in order from the unwinder, a tube-forming apparatus for forming the unwound web in a tubular shape after sterilizing it, a liquid supply pipe for filling fluid content in the packaging material web which was formed in the tubular shape, and a container-forming apparatus for laterally sealing the web and cutting sealed parts of the web to continuously form pillow-shaped containers each having a rectangular shape in cross section while downwardly supplying the tube filled with the fluid content by the length corresponding to one container, and a container shaping apparatus for bending each end part of the pillow-shaped containers which are separated into individual ones to shape each pillow-shaped container in a parallelepiped container to be finally obtained (as disclosed in JP-A 58-193206 and JP-A 61-93010).

In the conventional filling and packaging apparatus, two pairs of lateral seal bars are vertically alternately movable and are provided with a pressure application mechanism for laterally sealing and cutting a packaging material web formed in a tubular shape. As shown in FIG. 1, the pressure application mechanism comprises a heating mechanism called inductors 2 for melting a resin of the web 1, a cooling mechanism such as pipes 3 of cooling refrigerant for quickly cooling the melted resin, and a cutting mechanism having a cutter blade 4 for accurately cutting and separating sealed parts of the laterally sealed package containers into individual ones. When the containers are formed using the lateral seal bars, heating, cooling and cutting processes can be performed continuously and integrally, and timing between these processes can be adjusted and controlled very easily, thereby achieving an excellent method of manufacturing the containers.

A capacity of the filling and packaging apparatus of this type for manufacturing containers per hour depends on the speed involved in a pressure application process in the lateral seal bars provided with heating, cooling and cutting mechanisms, and it takes about 0.6 second for performing the pressure application process corresponding to the length of one container. That is, the maximum manufacturing capacity per hour which has been conventionally performed is obtained by dividing one hour (3600 seconds) by 0.6 second per piece, namely, the quotient of 6000 pieces of containers. The apparatus having such a manufacturing capacity has been known as a high-speed filling and packaging apparatus.

In the pressure application process, it takes about 0.28 second for heating, 0.15 to 0.17 second for cooling and 0.15 to 0.17 second for cutting (0.6 second in total). The times involved in heating, cooling and cutting is required respectively to the minimum. For example, if the heating time is less than 0.28 second, a resin serving as a laminating material of the packaging material web is not sufficiently melted to make the sealing complete. If the cooling time is less than 0.15 to 0.17 second, the melted resin is cut in a state where it is not solidified, which caused an inconvenience that the sealing becomes incomplete and the melted resin is stuck to the cutter blade 4 to obstruct the succeeding cutting process. Further, a mechanical cutting by the cutter blade 4 takes 0.15 to 0.17 second at the minimum, which cannot be further reduced.

Under these circumstances, it has been considered impossible to develop a superhigh-speed packaging apparatus having a capacity of manufacturing more than 6000 pieces of containers per hour, namely, 8000 pieces of containers per hour. In the conventional lateral seal bars, as shown in FIG. 1, an accommodation part 6 of the cutter blade 4 is disposed between sealing pressure receivers 5 made of rubber at one of the seal bars, and a cutter receiver 7 is disposed between the inductors 2 at the other of the seal bars. With such an arrangement, it is inevitable that a remaining part 8 (fluid remaining part) of the fluid content such as juice is produced in a groove defined between the accommodation part 6 and cutter receiver 7 while they are positioned in the heat seal part when subjected to heat sealing. Accordingly, fluid such as juice is stuck to the cutter when the web is cut, thereby permitting the cutter to be easily rusted when acid fluid such as juice is stuck to the cutter. As a result, nicks are produced on the cutter blade by the rust, which frequently causes the problem of insufficient cutting. Further, there occurs another problem that the machine is soiled owing to the flow of fluid from the cut part of the web and the production of rust at the mechanical parts caused by the acidity of the filled fluid. There occurs still another problem that a material employed by the mechanical parts is restricted.

In addition to the above problems, there frequently occurs a problem that the liquid in the fluid remaining part is stuck to the cut part of the web when the web is cut and mold is gathered from the cut part of the web, about which consumers make complaints. In case that the web is filled with a colored content, when the fluid permeates from the cut part into the web, there causes a problem of extreme damage of image of the product, and hence the cut part is printed by the same color as the filled content, making the cut part unobtrusive.

As mentioned in detail above, in the filling and packaging apparatus of this type, the fluid remaining part in the cutting part causes a serious problem to influence the quality of the packaged product. Accordingly, in the cutter which is disposed to freely advance and retreat and the lateral seal bars having grooves for accommodating the tip end of the cutter to prevent the sealed parts from producing the fluid remaining part at the center thereof, there are known a remaining product removing apparatus in which the cutter cuts the packaging material at the advancing position and it stays at a position where the tip end of the cutter presses the packaging material at the retreating position to prevent a remaining object or residue from being produced (as disclosed in JP-A 7-24938), and a sealing apparatus including a third heating mechanism provided at the upper and lower edges of the groove to accommodate the tip end of the cutter therein in addition to the upper and lower heating mechanisms in the lateral seal bars, wherein the residue produced at the time of sealing is sealed by the upper and lower heating mechanisms and the third heating mechanism (as disclosed in JP-A 7-164524). However, these apparatuses cannot completely prevent the production of a fluid remaining part because of the presence of the groove formed by the accommodation part and receiver part of the cutter.

The filling and packaging apparatus of this type is employed when manufacturing germ-free filling packs under a strict microorganic control. Since the filling and packaging apparatus must be sufficiently washed when the filling contents are changed or a daily working is finished, thereby limiting the operating time of the apparatus. Further, in view of the recent tendency of the shortage of working hours, the working efficiency and improvement of the working ratio, the development of the filling and packaging apparatus capable of being manufactured at higher speed has been desired.

SUMMARY OF THE INVENTION

It is an object of the present invention to provide a filling and packaging apparatus having a manufacturing capacity capable of manufacturing 8000 pieces or more containers per hour which has been deemed impossible so far, and having a high efficiency at a superhigh speed without producing a fluid remaining part in the sealed parts between the containers.

The inventors of the application have improved the conventional lateral seal bars variously and tested and studied them aiming for development of a superhigh-speed and high efficient filling and packaging apparatus capable of manufacturing 8000 packs per hour which exceeds the manufacturing capacity for manufacturing 6000 packs per hour by a large margin, which however results in failure. Accordingly, the inventors devoted themselves to study every possibility of the conventional lateral sealing mechanism of a filling and packaging apparatus dismissing a fixed idea about the lateral sealing mechanism of this type. They have found that when the heating and cooling mechanisms of the pressure application mechanism in the conventional lateral sealing apparatus are separated from the cutting mechanism, the time involved in the cutting process in the conventional pressure application process can be reduced by 0.15 to 0.17 second, and the time involved in the pressure application process comprising the heating and cooling processes is 0.43 to 0.45 second (corresponding to 8000 packs or more per hour). When the heating and cooling mechanisms are separated from the cutting mechanism, the sealed parts of the containers to be cut are in a suspended state, namely, they are suspended, and hence it seems that the containers cannot be cut accurately at high speed. The inventors have still tested and studied the filling and packaging apparatus of various types having the cutting mechanism which is separated from the heating and cooling mechanisms in the pressure application mechanism of the lateral sealing apparatus, and unexpectedly completed the invention of the cutting apparatus capable of accurately cutting the sealed parts of the containers which are in a suspended state at high speed, and of separating the containers into individual ones, and these effects have been confirmed by the inventors.

That is, the present invention relates to a filling and packaging apparatus for filling a fluid content in the tubular shaped packaging material web to manufacture package containers wherein the filling and packaging apparatus comprises a lateral sealing apparatus for laterally sealing a tubular web filled with a fluid content at intervals each corresponding to one container and a cutting apparatus for cutting sealed parts of the containers which are disposed under the lateral sealing apparatus in the suspended state and for separating the containers into individual ones.

The filling and packaging apparatus of the present invention has a feature in the cutting apparatus and the lateral sealing apparatus provided with an improved lateral seal bar. Other mechanisms of the filling and packaging apparatus of this type, for example, a conveying mechanism of a packaging material web, a sterilizing mechanism of the packaging material web, a vertical sealing mechanism for forming a plate-like web in a tubular shape, a carrying mechanism of a formed package container, etc. are not specifically limited, but are of any type including known members, however, they are preferable to be formed of any member capable of fully displaying their capacity of the superhigh-speed filling and packaging apparatus of the present invention.

PREFERRED EMBODIMENT OF THE INVENTION

A filling and packaging apparatus according a preferred embodiment of the invention will be now described with reference to the secured drawings. However, the present invention is not limited to the preferred embodiment set forth hereunder.

Figure 2:
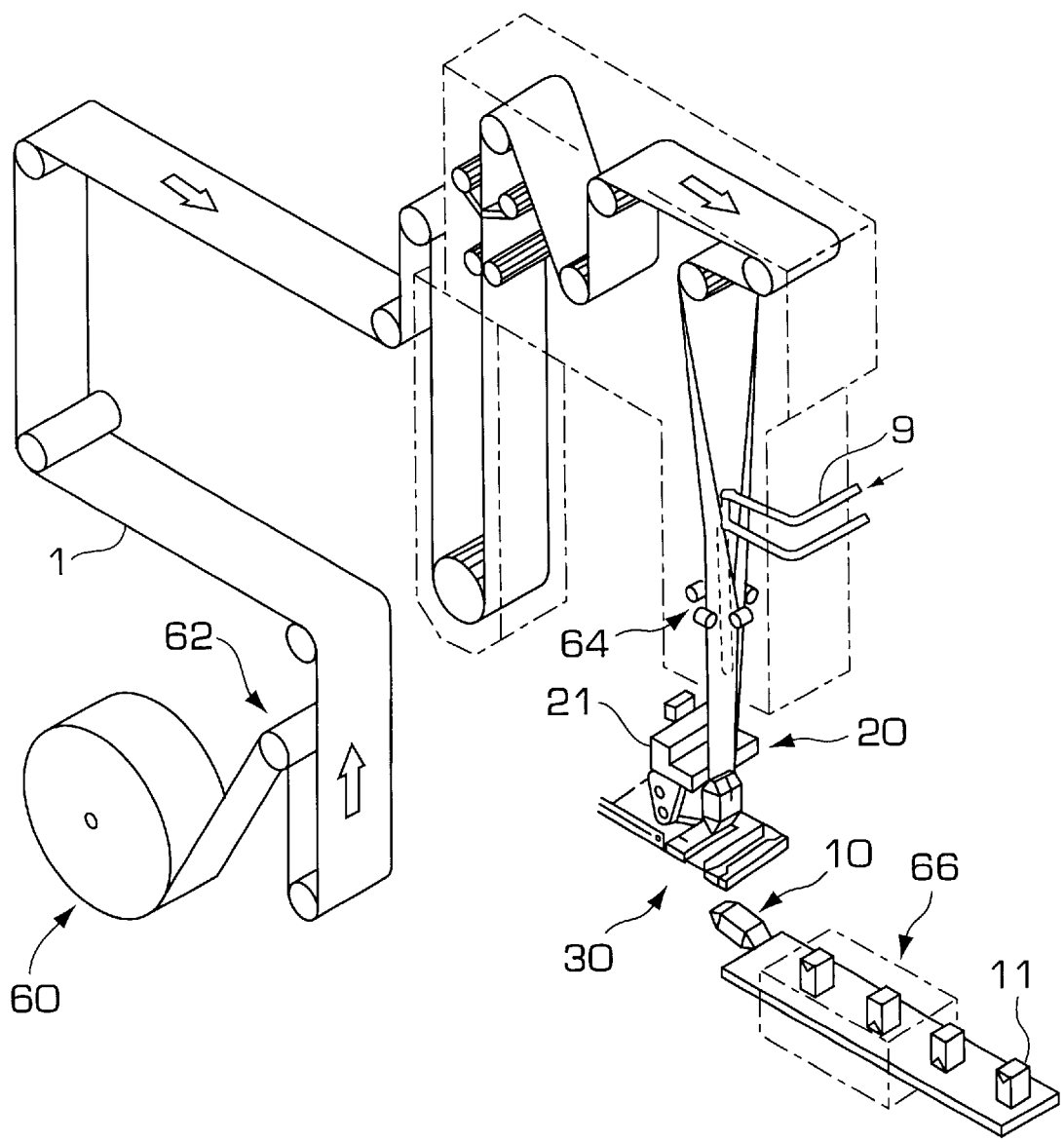
FIG. 2 is a schematic perspective view of a filling and packaging apparatus according to the present invention.

As shown in FIG. 2, the entire arrangement of the filling and packaging apparatus of the present invention comprises an unwinder 60, for supporting a packing material web 1 in a rolled state, an unwinding apparatus 62 for unwinding the web in order from the unwinder, a tube-forming apparatus 64 for forming the unwound web in a tubular shape after sterilizing it, a liquid supply pipe 9 for filling fluid content in the packaging material web 1 which was formed in the tubular shape, and a lateral sealing apparatus 20 for laterally sealing the web to continuously form pillow-shaped containers 10 while downwardly supplying the tube filled with the fluid content by the lengths each corresponding to one container, and a cutting apparatus 30 disposed under the lateral sealing apparatus for cutting sealed parts of the pillow-shaped containers in a suspended state to separate the containers into individual ones, and a container shaping apparatus 66 for bending each end part of the separated pillow-shaped containers to shape each pillow-like container in a parallelepiped container to be finally obtained.

Figure 3:
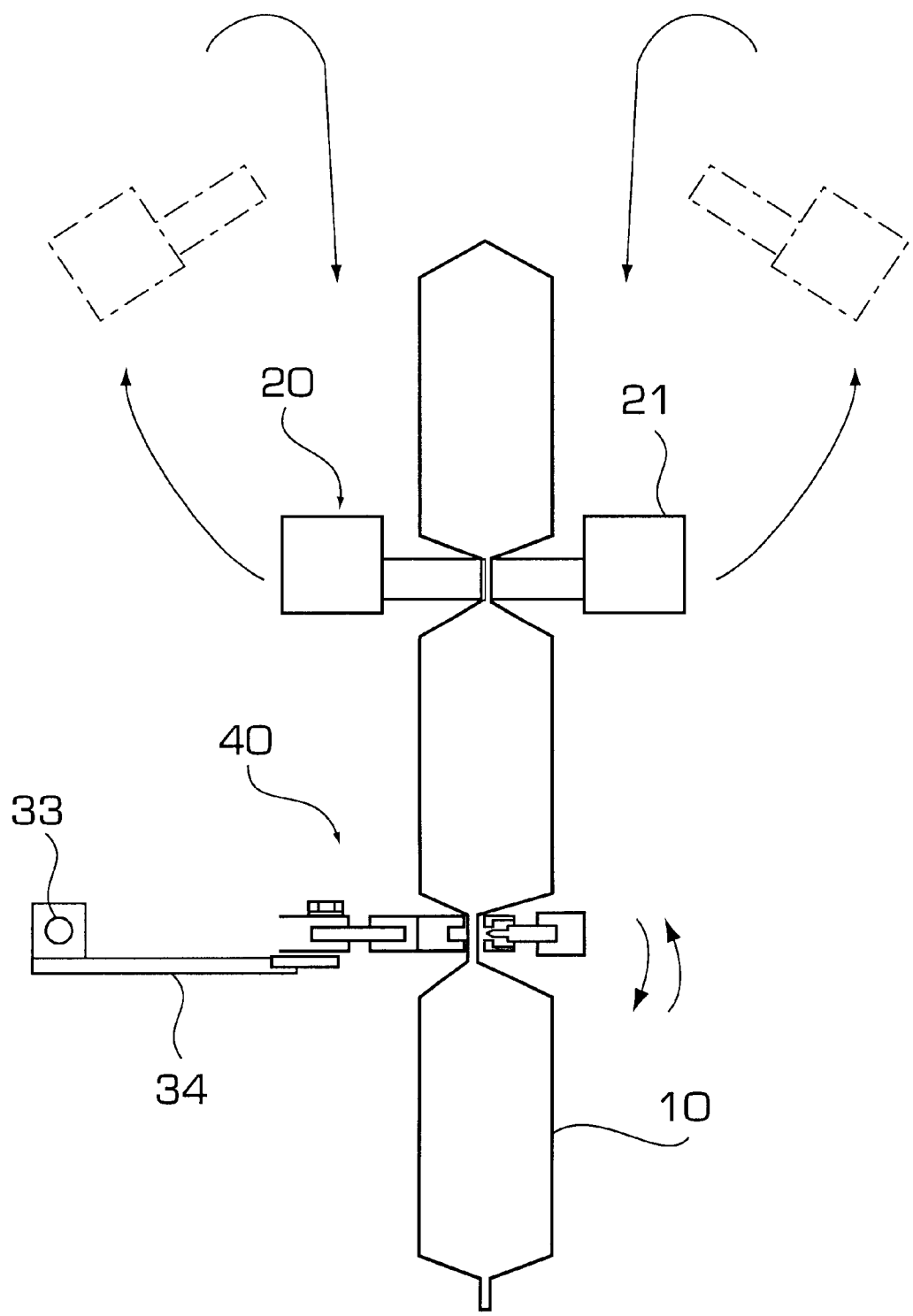
FIG. 3 is a view showing operations of a lateral seal bar and a cutting apparatus according to the present invention.

The lateral sealing apparatus 20 may be of any type except a lateral seal bar 21 provided that it has a mechanism and a structure shown in JP-A 58-193206 or JP-A 61-93010. As shown in FIG. 3, the lateral sealing apparatus 20 has two pairs of lateral seal bars 21 which are disposed to freely open and close (although in FIG. 2, only a pair of lateral seal bars 21 are shown). The lateral seal bars 21 are driven in a manner that paired ones open or close and move upward or downward in opposite directions with a given cycle owing to the turning of a plurality of sets of cams which are respectably provided in the filling and packaging apparatus. That is, a pair of lateral seal bars 21 move away from each other when they move upward, namely, they move upward so as to stride over another pair of lateral seal bars 21 which move downward while nipping and pressing a tubular container, so that the pair of lateral seal bars 21 laterally seal the tubular container which is nipped and pressed by them when they move downward. As a result, pillow-like containers are continuously formed with the repetition of such operations.

Figure 1:
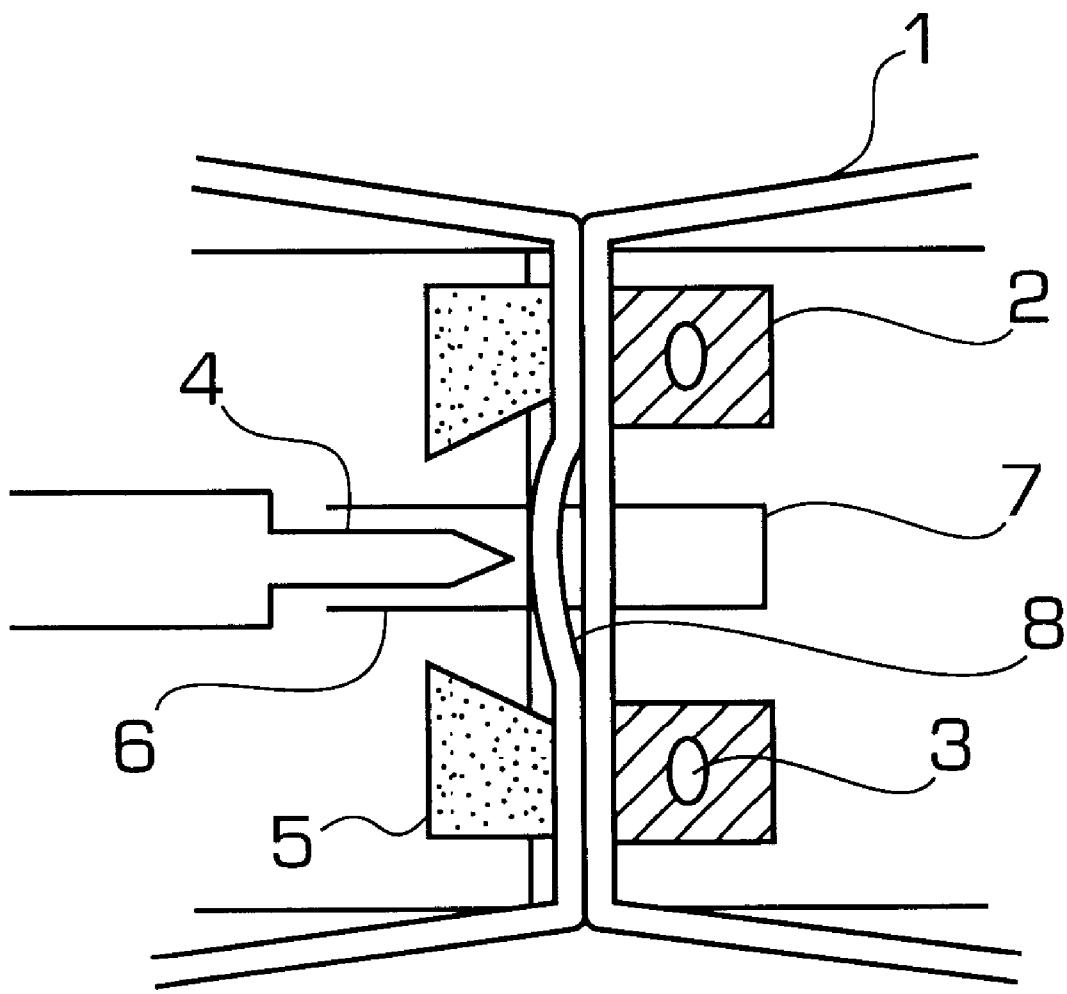
FIG. 1 is a longitudinal sectional view of a conventional lateral seal bar.
Figure 4:
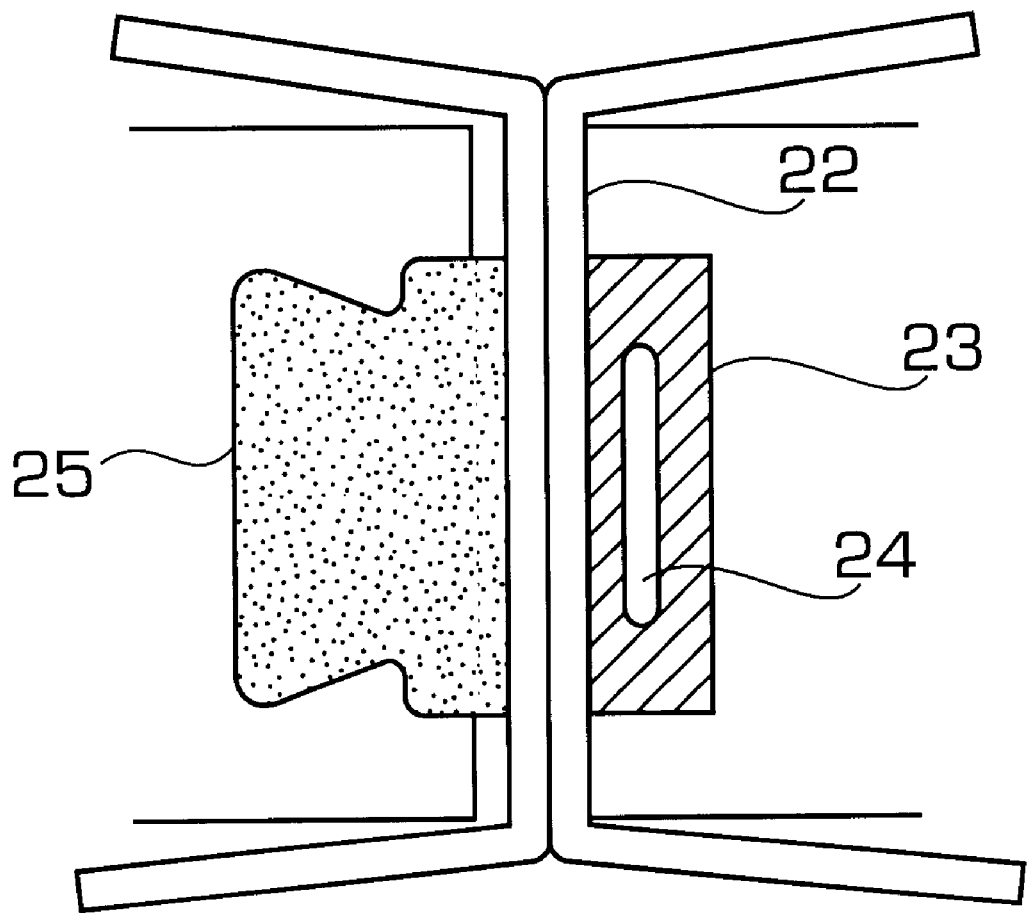
FIG. 4 is a longitudinal sectional view of the lateral seal bar according to the present invention.

As shown in FIG. 4, each of the pair of lateral seal bars 21 has a pressure application surface 22 having a length which is substantially the same as the sealed parts of the containers. An inductor 23 for heating a packaging resin and a cooling pipe 24 are provided at one of the lateral seal bars 21 and a sealing pressure receiver 25 made of rubber having a width which is substantially the same as the width of the inductor 23 is provided at the other of the lateral seal bars 21. The lateral seal bar 21 has no groove which has been defined in the conventional lateral seal bar 21 shown in FIG. 1 between the accommodation part 6 and cutter receiver 7. Accordingly, a fluid remaining part which has been conventionally produced is not at all produced when the tubular container is laterally sealed.

According to the preferred embodiment, the lateral seal bar 21 is not limited to that having the aforementioned structure but may be of any type, for example, it may be any type provided with a means for sealing the packaging material web but not provided with a means for cutting the web, provided that no fluid remaining part is produced.

The cutting apparatus 30 will be now described with reference to FIGS. 5 to 13.

Figure 5:
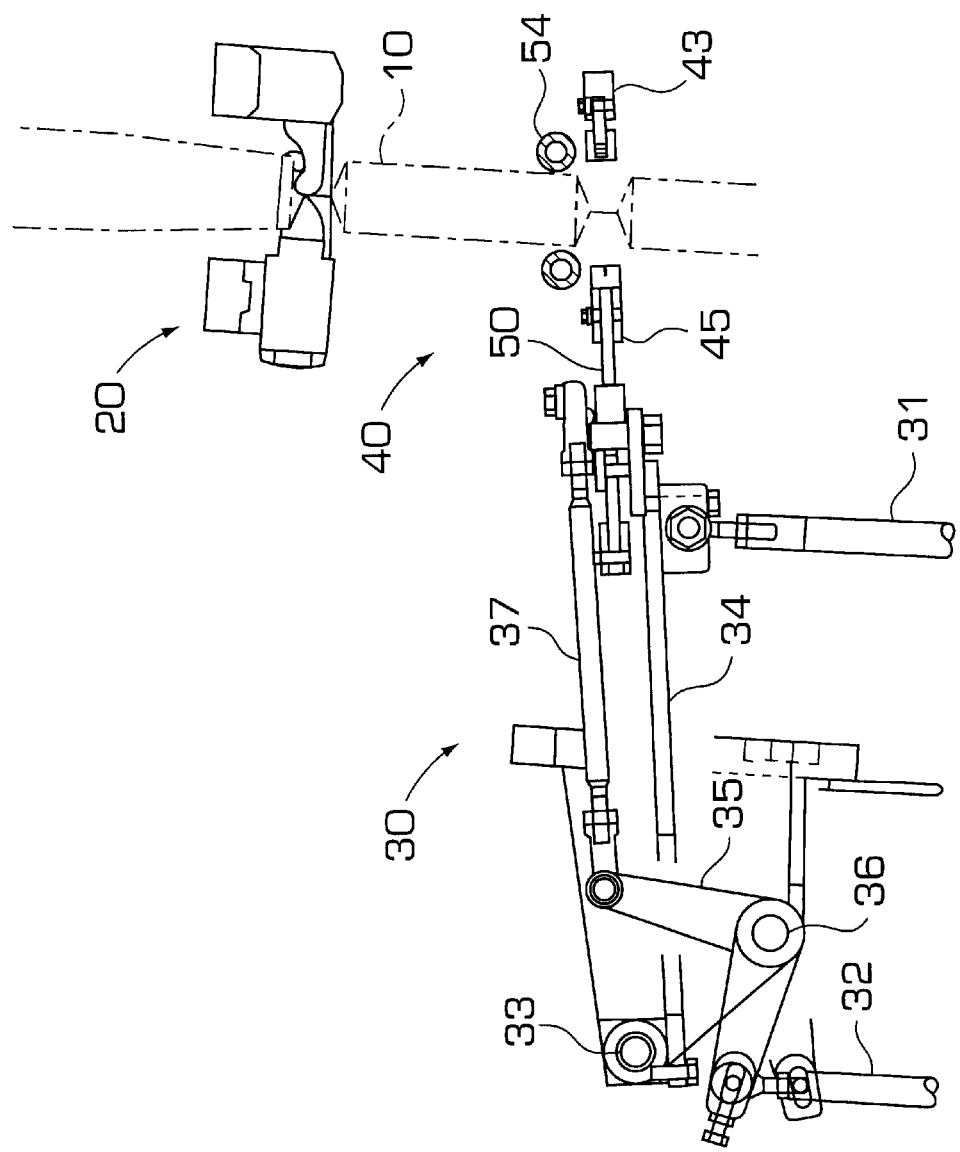
FIG. 5 is a longitudinal sectional view of the cutting apparatus according to the present invention.

A cutter elevating cam and a cutter closing cam respectably provided on a main shaft are supported on the same shaft, not shown, at the base of the cutting apparatus 30, wherein pivotally movable levers are provided at each upper portion of the cutter elevating cam and cutter closing cam, and wherein driving forces of the cutter elevating cam and cutter closing cam are transmitted to each lever by cam followers. A cutter elevating vertical rod 31 and a cutter closing vertical rod 32 are respectively secured to each end of levers so as to be vertically movable as shown in FIG. 5. When the cutter elevating cam and the cutter closing cam are turned, the levers pivotally move so that the cutter elevating vertical rod 31 and cutter closing vertical rod 32 respectably vertically move with a given timing.

The cutter elevating vertical rod 31 and cutter closing vertical rod 32 may vertically move with a given timing by a mechanism utilizing a hydraulic pressure such as a hydraulic cylinder without resorting to a cam mechanism.

The other end of the cutter elevating vertical rod 31 is secured to a lower end of a pivotally movable frame 34 which is movable about a shaft 33 serving as a fulcrum, while a cutting unit 40 is secured to the tip end of the pivotally movable frame 34. When the cutter elevating vertical rod 31 moves vertically, the pivotally movable frame 34 and the cutting unit 40 secured thereto pivotally move about the a shaft 33.

The other end of the cutter closing vertical rod 32 is secured to one end of an L-shaped lever 35. The other end of the L-shaped lever 35 is turned about a shaft 36 when the cutter closing vertical rod 32 moves upward and downward so that a cutter closing rod 37 having one end connected to the other end of the L-shaped lever 35 moves forward and backward. The other end of the cutter closing rod 37 is connected to one of a right-angled corner of a substantially right-angled triangle link plate 41 provided in the cutting unit 40.

Figure 6:
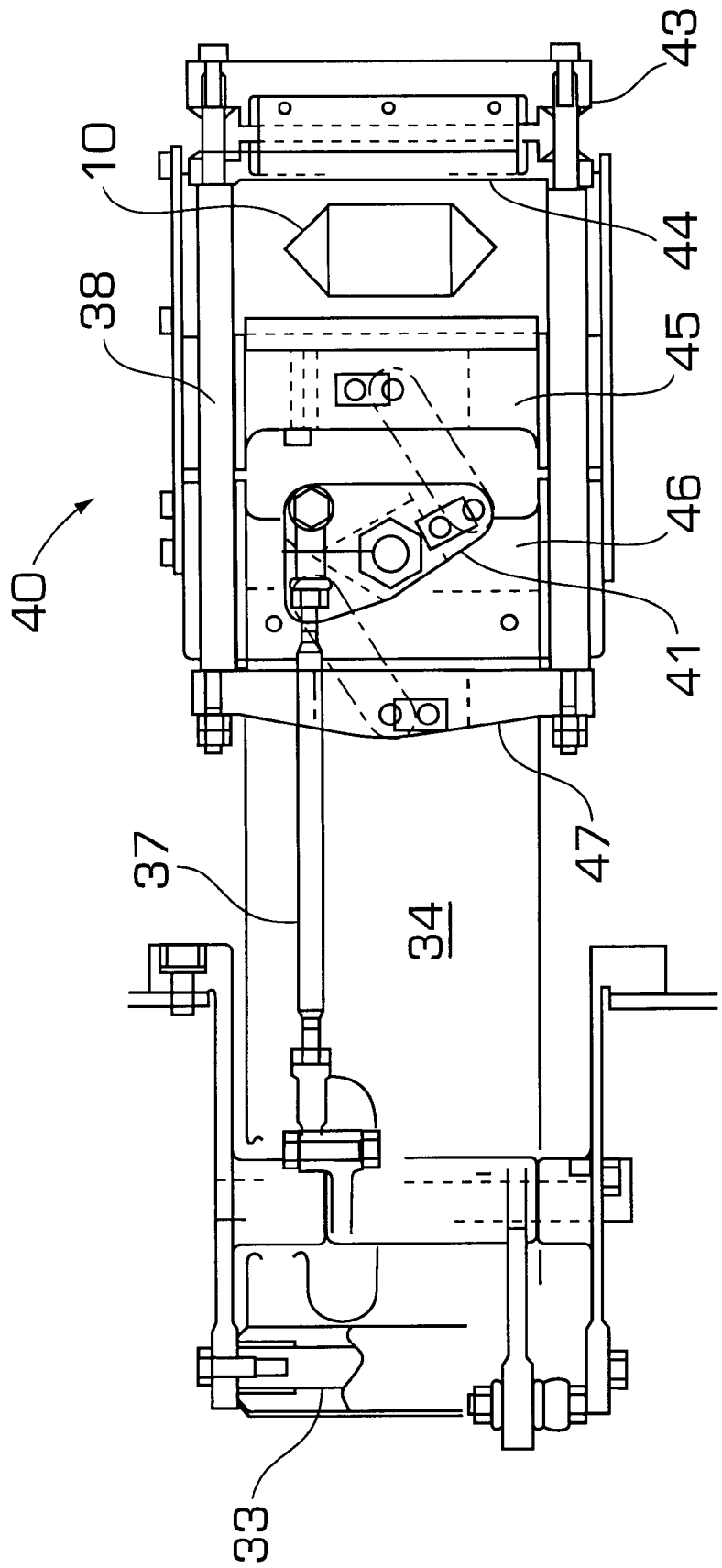
FIG. 6 is a longitudinal plan view of the cutting apparatus according to the present invention.
Figure 7:
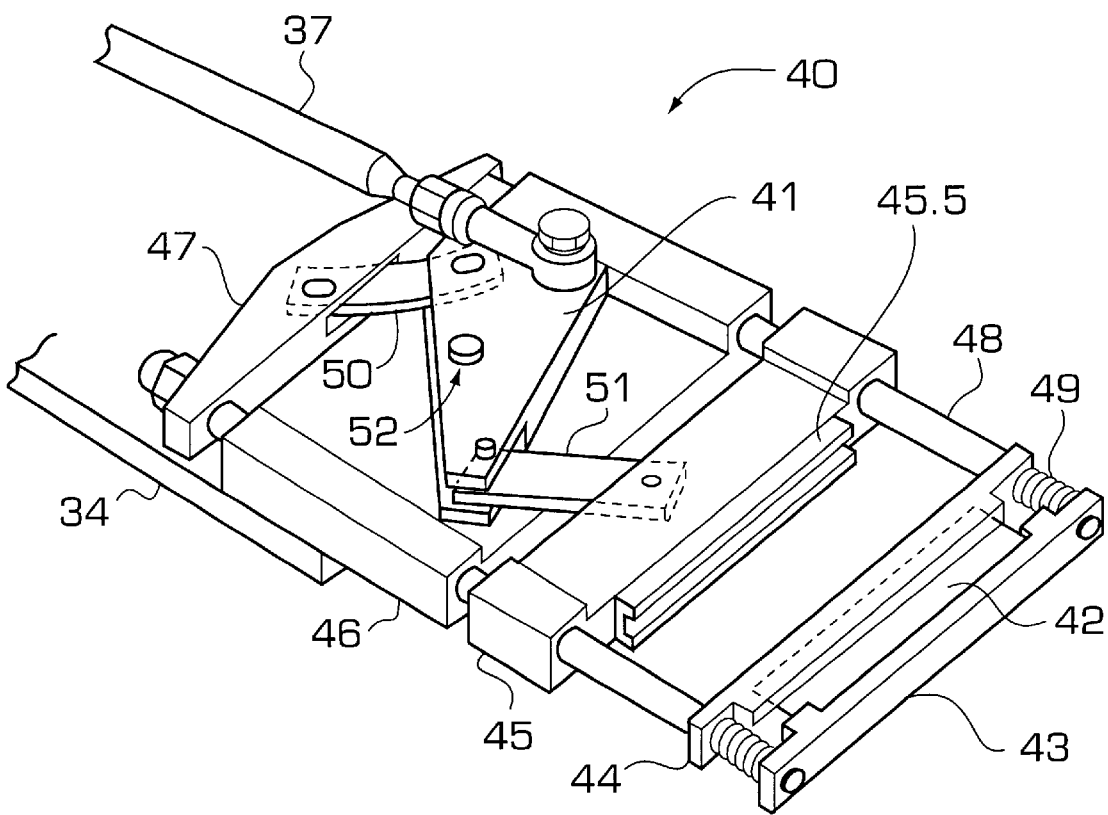
FIG. 7 is a perspective view of a cutting unit according to the present invention.

As shown in FIGS. 6 and 7, the cutting unit 40 comprises a cutter holder member 43 having a cutter plate 42, a cutter accommodation member 44, a cutter receiver member 45 which are respectively arranged in parallel with one another, the link plate 41, a link plate support member 46, a block member 47, and two rods 48 for connecting these members. Each of the two rods 48 comprises a small diameter part for connecting the cutter holder member 43 and cutter accommodation member 44 and a large diameter part for connecting the cutter receiver member 45, link plate support member 46 and block member 47. The cutter accommodation member 44 which is penetrated by the small diameter part of the rod 48 does not slide toward the large diameter part but can slide toward the cutter holder member 43. The cutter accommodation member 44 is forced toward the cutter receiver member 45 by a spring 49 and is retained by the large diameter part other than during a cutting operation. The end of the small diameter part of the rod 48 penetrates the cutter holder member 43 and is fixed to the cutter holder member 43. The cutter receiver member 45 and link plate support member 46 are slidable along the large diameter part of the rod 48, and the end of the large diameter part penetrates the block member 47 and is fixed to the block member 47.

The link plate 41 is secured to the upper surface of the link plate support member 46 so as to be turned on the link plate support member 46. The other end of the cutter closing rod 37 is connected to one of the right-angled corners of the link plate 41 having substantially a right-angled triangle. Links 50 and 51 are respectively secured to two corners of the link plate 41 except the right-angled corner to be turned on the link plate 41, while the other end of the link 50 is connected to the block member 47 and the other end of the link 51 is connected to the cutter receiver member 45. A turning shaft 52 of the link plate 41 is disposed at substantially the central part of two corners other than the right-angled corner of the link plate 41. When the cutter closing rod 37 moves forward and backward, the link plate 41 is turned about the turning shaft 52 on the link plate support member 46.

When the cutter closing rod 37 moves backward (right to left in FIG. 5), the link plate 41 turns counterclockwise so that the link 50 presses the block member 47 and the link 51 presses the cutter receiver member 45. When the link 50 presses the block member 47, the block member 47 moves leftward (the direction in FIG. 5, the same hereinafter) since the link plate support member 46 is fixed to the pivotally movable frame 34. The rods 48 fixed to the block member 47 also slide leftward through communication holes provided in the link plate support member 46 as the block member 47 moves, so that the cutter holder member 43 which is fixed to the end of the small diameter part of the rod 48 and the cutter accommodation member 44 which is forced leftward by the spring and retained by the large diameter part respectively move leftward.

When the link 51 presses the cutter receiver member 45, the cutter receiver member 45 moves while it slides rightward, and it cooperates with the cutter accommodation member 44 which moves leftward to serve as a cutting bar, so as to nip the sealed parts between the containers.

When the link plate 41 further turns counterclockwise, the block member 47 is pressed leftward by the link 50 and the cutter receiver member 45 is pressed rightward by the link 51, so that the cutter receiver member 45 and cutter accommodation member 44 press against each other, and hence the cutter accommodation member 44 permits the small diameter parts of the rods 48 to slide rightward against the resilient force of the spring 49, and permits the cutter plate 42 fixed to the cutter holder member 43 to protrude from the through holes defined in the cutter accommodation member 44 to advance to the groove 45.5 that receives the tip end of the cutter provided in the cutter receiver member 45, whereby the sealed parts between the containers are cut.

When the cutter closing rod 37 advances while it changes its direction, the link plate 41 turns clockwise so that the block member 47 and cutter receiver member 45 draw each other by the links 50 and 51 as the link plate 41 further turns. As a result, the progress is opposite to the cutting process, so that the cutter receiver member 45 and cutter accommodation member 44 move away from each other and the cutter plate 42 retreats. When the cutter closing rod 37 repeats the advance and retreat alternately, the sealed parts between the containers in a suspended state are successively cut.

Since the link plate support member 46 is fixed to the pivotally movable frame 34 to which the cutter elevating vertical rod 31 is connected, the cutting unit 40 per se moves pivotally together with the pivotally movable frame 34 when the cutter elevating vertical rod 31 moves vertically. The vertical pivotal movement of the cutting unit 40 is performed in synchronism with the vertical movement of the lateral seal bar 21 in the vicinity of a bottom dead center. Further, the cutting by the cutting unit 40 and the vertical pivotal movement of the cutting unit 40 are adjusted to be synchronized with each other. It is adjusted that the sealed parts are cut when the cutting unit 40 reaches the vicinity of the intended cutting point.

Figure 8:
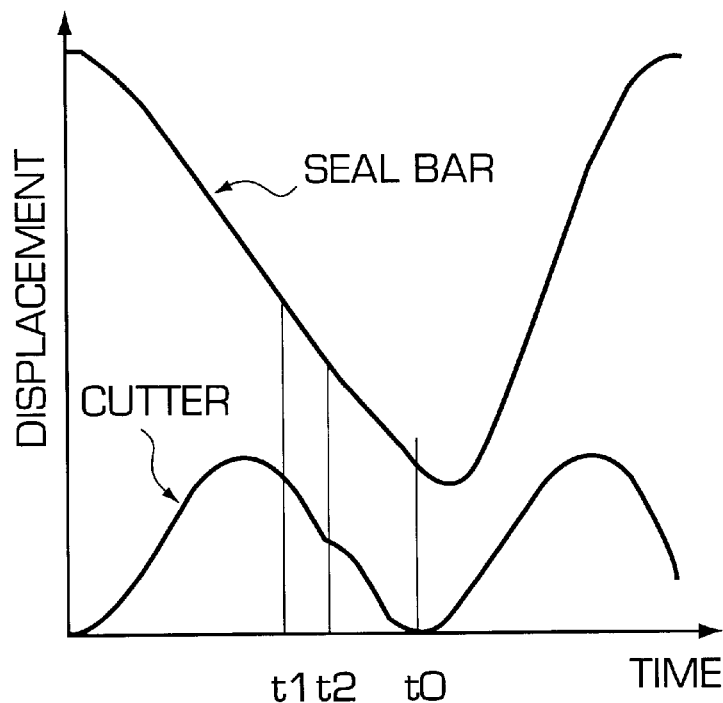
FIG. 8 is a view for explaining timing for driving the lateral seal bar and cutting unit according to an example of the present invention.

Explained next in FIG. 8 is an example of timing for driving the lateral seal bar 21 and cutting unit 40 when the cutting and pivotal movement are performed.

According to this example, when the lateral seal bar 21 and cutting unit 40 lower together, the interval between the lateral seal bar 21 and cutting unit 40 in the vertical direction is set to be equal to each other from a specific time t1, and only the lowering of the cutting unit 40 is temporarily delayed at a time t2, namely, the cutting unit 40 moves downward later than the lowering operation of the lateral seal bar 21 to reach the bottom dead center so that the distance between the lateral seal bar 21 and cutting unit 40 in the vertical direction is slightly reduced and the cutting by the cutting unit 40 is performed upon elapse of the time t2. After the cutting, the lateral seal bar 21 reaches the bottom dead center at a time t0 by the reduced interval.

Figure 9:
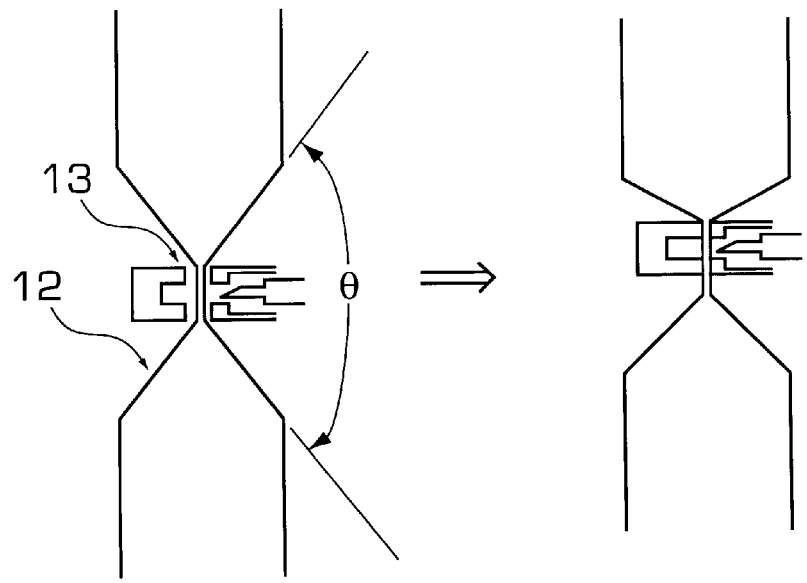
FIG. 9 is a view for explaining a cutting operation with driving timings of FIG. 8.

In this example, as shown in FIG. 9, at the time when the cutter receiver member 45 and cutter accommodation member 44 constituting the cutting bar respectively approach the sealed parts, the lowering speed of the cutting bar is set to be slightly slower than that of the lateral seal bar so that the cutting bar serves as a guide of the sealed parts. As a result, the cutting bar relatively ascends while guiding the sealed parts and it is in pressing contact at the boundary between the sealed parts of the containers and tapered parts 12, thereby positioning the cutting part to perform the cutting accurately at the intended cutting point. According to this example, the angle θ formed between the tapered parts 12 of the pillow-like containers becomes slightly greater to perform the accurate cutting at the intended cutting point even if the tapered parts 12 of the container difficulty serving as a guide.

Figure 10:
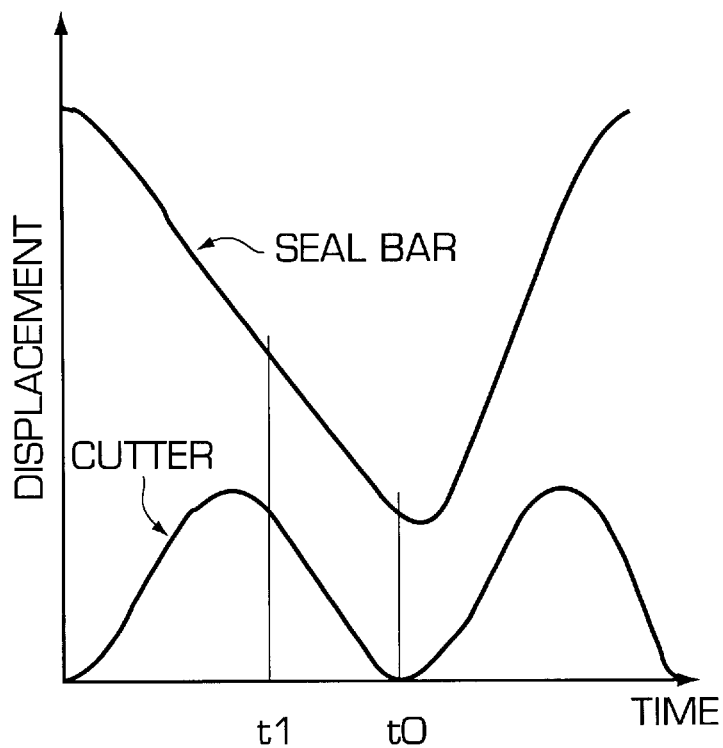
FIG. 10 is a view for explaining timing for driving the lateral seal bar and cutting unit according to another example of the present invention.

Explained next in FIG. 10 is another example of timing for driving the lateral seal bar 21 and cutting unit 40 when the cutting and pivotal movement are performed.

According to this example, when the lateral seal bar 21 and cutting unit 40 lower together, the cutting unit 40 moves downward in synchronism with the lowering operation of the lateral seal bar 21 to reach the bottom dead center so that the distance between the lateral seal bar 21 and cutting unit 40 in the vertical direction become the same interval from a specific time t1, then the cutting unit 40 reaches the bottom dead center at a time t0 while keeping this interval, and finally performs cutting at an intended time between the times t1 and t0.

Figure 11:
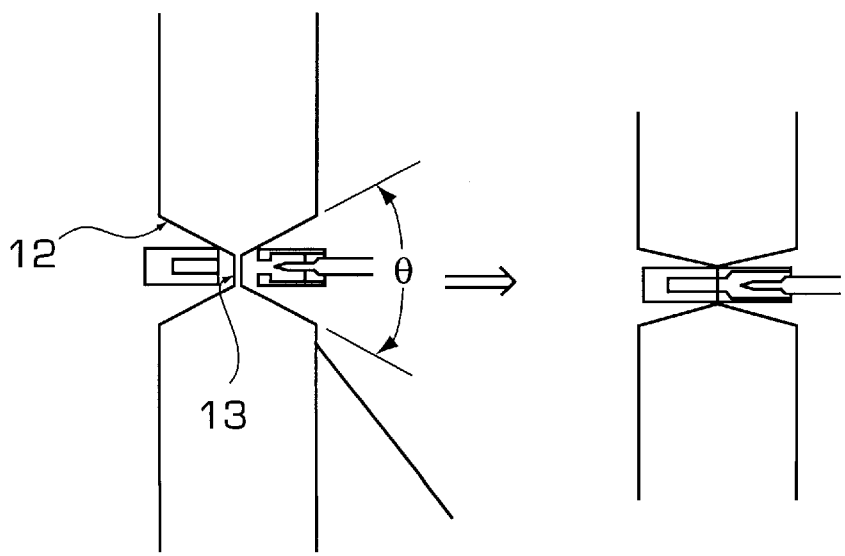
FIG. 11 is a view for explaining a cutting operation when a container pivotally moves.
Figure 12:
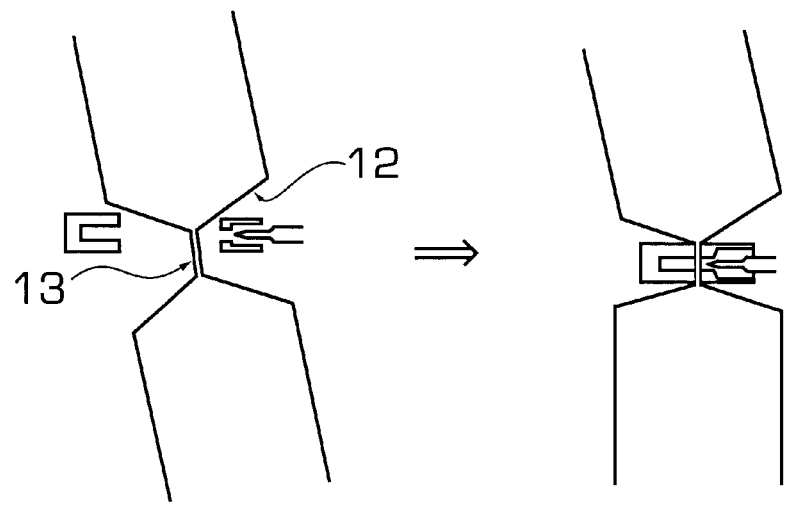
FIG. 12 is a view for explaining a cutting operation when the container is deformed.

In this example, although the accuracy of the cutting position is slightly more inferior than that shown in FIG. 8, the tapered parts 12 of the container serve as a guide of the cutting bar when the angle θ formed between the tapered parts 12 of the containers is reduced in the container forming apparatus as shown in FIG. 11 so that the positioning of the cutting part is performed to perform the accurate cutting at the intended cutting point on the sealed parts. Although there is a case that a container in the suspended state pivotally moves back and forth and right and left owing to the vibration, etc. caused by the high-speed formation thereof, it is possible that even in such a case the positioning of the cutting part is performed to perform the accurate cutting at the intended cutting point on the sealed parts since the tapered parts 12 of the container serve as a guide of the cutting bar shown in FIG. 12 . Further, even if the container per se is deformed slightly in a longitudinal direction owing to the weight of the fluid content when the filling amount is large, e.g. 1 liter, the tapered parts 12 of the container serve as a guide of the cutting bar, to correct the deformation of the container, thereby performing the accurate cutting at the intended cutting point on the sealed parts.

Figure 13:
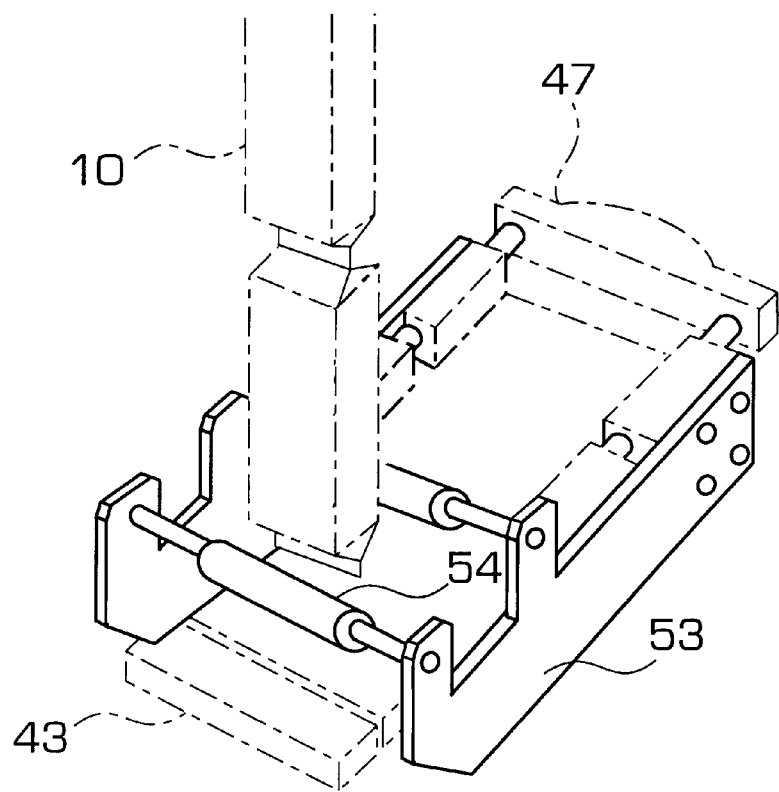
FIG. 13 is a schematic perspective view of a container guide roller which is disposed in the cutting apparatus of the present invention.

Further, it is possible to provide guide roller attachment plates 53 integrally on both ends of the link plate support member 46 as shown in FIG. 13 and to provide a pair of container guide rollers 54 on the upper ends of the guide roller attachment plates 53. When the container guide rollers are arranged in such a manner, the container positioned between the lateral seal bar 21 and cutting unit 40 can be nipped substantially vertically when the sealed parts are cut so that the sealed parts in a suspended state are stabilized and the cutting accuracy is improved.

In the above embodiment, although the vertical movement of the cutting unit 40 is performed by the pivotal movement, the cutting unit 40 can move vertically while it remains in a horizontal state by a mechanism utilizing a cam mechanism or a hydraulic pressure.

The filling and packaging apparatus according to the present invention can manufacture 8000 packs or more per hour which has been deemed impossible so far, and the fluid remaining part is not at all produced between the sealed parts of the containers, thereby preventing the cut surface of the container from being stuck by juice, etc.

Since there are provided a set of cutting apparatuses in the filling and packaging apparatus of the present invention, the filling and packaging apparatus is simple in construction compared with the conventional filling and packaging apparatus having plural sets of cutting apparatuses, and further there is no interference between the cutting apparatuses and the cutting can be performed in the minimum space, thereby making the filling and packaging apparatus small-sized.

Still further, since the tapered parts of the pillow-like container are utilized as a guide to enhance the positioning accuracy when the containers are cut according to the present invention, the center of the sealed parts between the containers can be cut accurately.

What is claimed is:

1. A filling and packaging apparatus for manufacturing package containers comprising:

an unwinder for supporting a packaging material web in a rolled state;

an unwinding apparatus for unwinding the web sequentially from the unwinder;

a tube-forming apparatus for forming unwound web into a tubular shape after sterilizing the web;

a liquid supply tube for filling the web which was formed in the tubular shape with fluid;

a lateral sealing apparatus for laterally sealing the web to continuously form pillow-shaped containers while downwardly supplying the tubular-shaped web filled with the fluid by a distance corresponding to one container;

a cutting apparatus disposed under the lateral sealing apparatus for cutting sealed parts of the pillow-shaped containers while they are in a suspended state to separate the containers into individual ones; and container shaping apparatus for bending each end part of the separated pillow-shaped containers to shape each pillow-shaped container into a rectangular parallelepiped container, wherein the lateral sealing apparatus includes two pairs of lateral seal bars which move vertically alternately, and a heating means for laterally sealing the tubular web filled with the fluid at intervals, each of the intervals corresponding to one container, each of the lateral seal bars having means to heat-seal the packaging material web; the cutting apparatus is disposed under the lateral sealing apparatus and remote therefrom, and the cutting apparatus includes a cutting unit which is composed of a cutting part and a cutting bar that pivotally moves vertically, and nips and cuts sealed parts of the containers while the containers are suspended to separate the containers into individual containers.

2. The filling and packaging apparatus according to claim 1, wherein the vertical movement of the cutting unit is performed by a pivotal movement.

3. The filling and packaging apparatus according to claim 1, wherein the cutting unit moves downward slightly later than a time when the lateral seal bar moves downward to reach a bottom dead center.

4. The filling and packaging apparatus according to claim 1, wherein the cutting unit moves downward synchronously with a time when the lateral seal bar moves downward to reach a bottom dead center.

5. The filling and packaging apparatus according to claim 1, wherein the vertical movement of the cutting unit and a cutting mechanism of the cutting unit are respectively driven by a mechanism utilizing a cam mechanism and/or hydraulic pressure.

6. A cutting apparatus for use in a filling and packaging apparatus for filling a packaging material web formed in a tubular shape with fluid to manufacture package containers, which filling and packaging apparatus includes a lateral sealing apparatus with two pairs of lateral seal bars that alternately move vertically to seal the tubular web, said cutting apparatus including a cutting unit, means remote from the lateral sealing apparatus for disposing the cutting unit remote from and in a position under the lateral sealing apparatus, and means for vertically moving the cutting unit when the cutting unit moves pivotally, the cutting unit nipping and cutting sealed parts of the containers while the containers are suspended to separate the containers into individual containers when said cutting unit moves downward, the cutting unit including a support member, a link plate pivotally attached to the support member, the link plate having a first link and a second link, a first member engagable by the first link, a second member engagable by the second link, a third member including a cutter plate, and means connecting the first member, the second member, and the third member, whereby when the link plate turns, the first link presses the first member in a first direction and the second link presses the second member in a second direction opposite the first direction, whereupon the first member forces the third member to move in the first direction toward the second member, and the second member moves in the second direction toward the third member until the cutter plate contacts the second member to cut the sealed parts of the container.

7. The cutting apparatus according to claim 6, wherein, the link plate has a substantially triangular shape with one corner thereof substantially being a right-angle, the first link and the second link extend from respective corners of the link plate other than the right-angle corner, and the link plate is pivotally attached to the support member at a location substantially central between the two corners from which the first and second links extend.

8. The cutting apparatus according to claim 7, wherein the connecting means includes a rod that connects the first, second and third members such that at least the second member slides along the rod.

9. The cutting apparatus according to claim 8, wherein the second member has a groove to receive a tip end of the cutter plate, and the third member includes a holding member for holding the cutter plate, an accommodation member for receiving the cutter plate and a spring disposed on the rod between the accommodation member and the holding member.

10. The cutting apparatus according to claim 7, further including a closing rod having one end pivotally connected to the link plate at the right-angle corner thereof.

11. The cutting apparatus according to claim 10, further including a vertical closing rod, and a L-shaped lever connecting another end of the closing rod to the vertical closing rod.

12. The cutting apparatus according to claim 11, further including a pivotally movable frame and means for pivotally moving the frame to produce the vertical movement of the cutting apparatus, and wherein the support member is disposed on the frame.

13. A method of manufacturing packaging containers using a filling and packaging apparatus including, an unwinder for supporting a packing material web in a rolled state, an unwinding apparatus for unwinding the web sequentially from the unwinder, a tube-forming apparatus for forming the unwound web in a tubular shape after sterilizing the web, a liquid supply tube for filling the web formed in the tubular shape with fluid, a lateral sealing apparatus having two pairs of lateral seal bars which alternately move vertically for laterally heat-sealing the web to continuously form pillow-shaped containers while downwardly supplying the tubular-shaped web filled with the fluid a distance corresponding to one container, a cutting apparatus disposed under the lateral sealing apparatus and including a cutting unit which is composed of a cutting part and a cutting bar, and which pivotally moves for cutting sealed parts of the pillow-shaped containers in a suspended state to separate the containers into individual ones, and a container shaping apparatus for bending each end part of the separated pillow-shaped containers to shape each pillow-shaped container into a rectangular parallelepiped container to be finally obtained, said method comprising the steps of:

unwinding the rolled material web with the unwinder and unwinding apparatus to obtain unwound web;

sterilizing the unwound web;

forming the unwound web into a tubular shape with the tube-forming apparatus to obtain a tubular web;

filling the tubular web with a fluid;

laterally heat-sealing the tubular web filled with the fluid at intervals corresponding to one container with the lateral sealing apparatus while supplying the tubular web downward by a distance corresponding to substantially one container to thereby form pillow-shaped containers filled with the fluid;

positioning the cutting part while the cutting bar is guided;

pivotally moving the cutting unit vertically and cutting sealed parts of the pillow-shaped containers while the containers are suspended to separate the containers into individual pillow-shaped containers; and shaping the individual pillow-shaped containers cut by the cutting part by bending the end parts thereof with the container shaping apparatus to form individual rectangular parallelepiped containers.

14. The method of manufacturing package containers using a filling and packaging apparatus including an unwinder for supporting a packing material web in a rolled state, an unwinding apparatus for unwinding the web sequentially from the unwinder, a tube-forming apparatus for forming the unwound web in a tubular shape after sterilizing the web, a liquid supply tube for filling the web formed in the tubular shape with fluid, a lateral sealing apparatus having two pairs of lateral seal bars which alternately move vertically for laterally heat-sealing the web to continuously form pillow-shaped containers while downwardly supplying the tubular-shaped web filled with the fluid a distance corresponding to one container, a cutting apparatus disposed under the lateral sealing apparatus and including a cutting unit which is composed of a cutting part and a cutting bar, and which pivotally moves vertically for cutting sealed parts of the pillow-shaped containers in a suspended state to separate the containers into individual ones, and a container shaping apparatus for bending each end part of the separated pillow-shaped containers to shape each pillow-shaped container into a rectangular parallelepiped container to be finally obtained, said method comprising the steps of:

unwinding the rolled material web with the unwinder and unwinding apparatus to obtain unwound web;

sterilizing the unwound web;

forming the unwound web into a tubular shape with the tube-forming apparatus to obtain a tubular web;

filling the tubular web with a fluid;

laterally heat-sealing the tubular web filled with the fluid at intervals corresponding to one container with the lateral sealing apparatus while supplying the tubular web downward by a distance corresponding to substantially one container;

forming tapered and sealed parts at respective end portions of the tubular web by the lateral seal bars to define a pillow-shaped container by the tapered parts, the sealed parts and the filled tubular web of the container;

positioning the cutting part while the cutting part is guided by the tapered part of the pillow-shaped container;

pivotally moving the cutting unit vertically and cutting the sealed parts of the pillow-shaped containers while the containers are suspended to separate the containers into individual containers; and shaping the individual pillow-shaped containers cut by the cutting part by bending the end parts thereof with the container shaping apparatus to form individual rectangular parallelepiped containers.

* * * * *